Feb. 10, 1931. R. S. MOORE ET AL 1,791,739
CLUTCH OPERATING DEVICE
Filed March 9, 1928 2 Sheets-Sheet 2

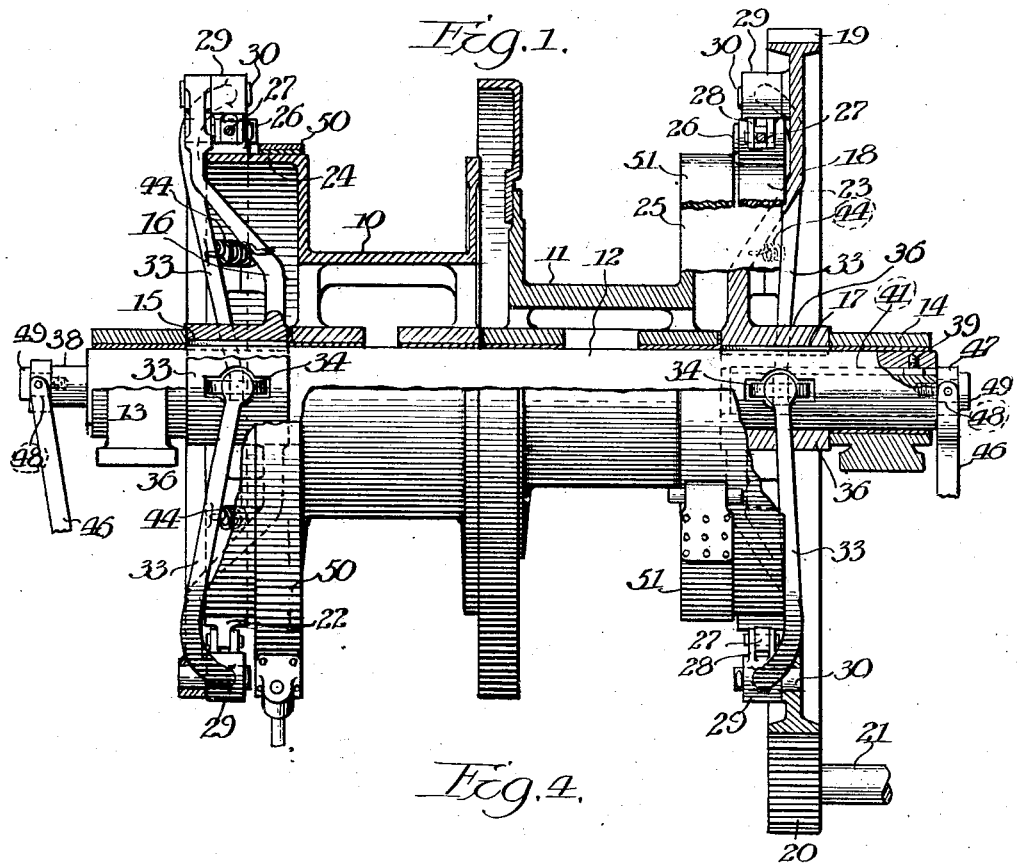
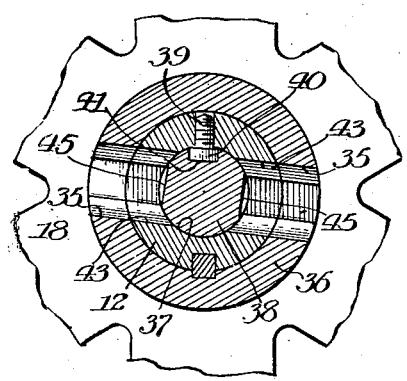

Inventors
Roy S. Moore
by Edward B. Nickles
Arthur L. Sprinkle Atty.

Patented Feb. 10, 1931

1,791,739

UNITED STATES PATENT OFFICE

ROY S. MOORE, OF CHICAGO, ILLINOIS, AND EDWARD B. NICKLES, OF MANITOWOC, WISCONSIN

CLUTCH-OPERATING DEVICE.

Application filed March 9, 1928. Serial No. 260,344.

This invention relates to clutch operating devices and particularly to a novel construction and arrangement of elements for operating a clutch mechanism, such, for example, as a friction clutch, shown, in the present instance, as of the contracting band and drum type.

One object of the present invention is to provide an efficient device of simple construction for contracting or tightening clutch bands carried by a driving member around a drum carried by a driven member in a manner to secure the driven member frictionally to the said driving member.

Another object of the invention is to provide a clutch operating device which is of compact form and capable of being mounted within the shaft on which the driving and driven members are mounted.

A further object of the invention is to provide a sturdy and substantial clutch operating device consisting of a minimum number of parts, and which may be easily and effectually actuated.

A still further object of the invention is to improve devices of this character in sundry details hereinafter described and particularly pointed out in the appended claims.

One embodiment of the invention is shown, for illustrative purposes, in the accompanying drawings, in which Fig. 1 is an elevational view, partly in section, of a plurality of cable drums and driving means therefor embodying our improved clutch operating device, the sectional portion of the figure being viewed approximately as indicated by the line 1—1 of Fig. 2.

Fig. 4 is a fragmentary sectional elevation taken on the line 4—4 of Fig. 3, with the anti-friction rollers of the bell-crank levers omitted.

Figure 2:
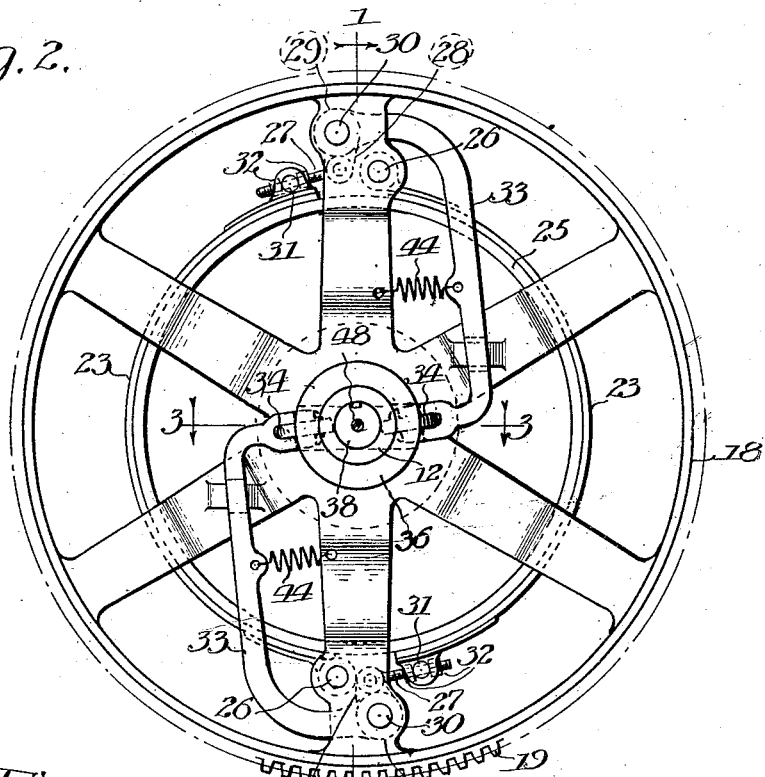
Fig. 2 is an end elevation of the clutch operating device as viewed from the right hand side of Fig. 1 with the clutch shipper fork or yoke removed.

Referring to the drawings, the illustrative embodiment of the invention is shown in connection with a plurality of cable drums 10 and 11, loosely mounted and independently rotatable on a drive shaft 12 which is rotatably mounted adjacent its end portions in bearing brackets 13 and 14.

Secured to the shaft 12 between the bracket 13 and cable drum 10, by means of a key 15, is a spoked wheel or ring 16, and secured also to the shaft 12, between the cable drum 11 and bracket 14, by means of a key 17, is a gear 18, the said ring 16 and gear 18 being of like construction, except that the gear 18 has teeth 19 formed thereon for engagement with a pinion 20 connected by means of a shaft 21 with any suitable source of power (not shown) by means of which the gear 18, shaft 12 and ring 16 are continuously driven.

Mounted on the ring 16 and gear 18, respectively, are pairs of friction clutch bands 22 and 23 surrounding and co-operable with clutch drums 24 and 25 mounted on, or formed integrally with, the cable drums 10 and 11 respectively.

One end of the bands 22 and 23 is pivotally connected respectively to oppositely disposed spokes of the ring 16 and gear 18 by means of studs or pins 26, while the opposite ends of the bands are pivotally connected by means of threaded links 27 to relatively short arms 28 of bell-crank levers 29, pivotally mounted in a manner to rock or oscillate on studs or pins 30 carried by the ring 16 and gear 18, the short arms 28 of the bell-crank levers 29 being adapted to extend inwardly toward the clutch drums 24 and 25. The threaded ends of the links 27 may extend loosely through pivot pins 31 carried by the ends of the bands 22 and 23, and may be provided with nuts 32 on opposite sides of the pins 31 for adjusting the end of the bands with respect to the short arms 28 of the bell-crank levers 29 in a manner to properly position the bands 22 and 23 with respect to the clutch drums 24 and 25.

For oscillating or rocking the bell-crank levers 29 about their respective pivotal connections 30 on the ring 16 and gear 18 in a manner to contract and expand the bands 22 and 23 with respect to the clutch drums 24 and 25, the levers 29 are provided respectively with oppositely disposed relatively long arms 33 extending inwardly toward the central portion of the ring 16 and gear 18 at opposite sides of shaft 12, the inner or adjacent bifurcated end portions of the arms 33 being provided with anti-friction rollers 34 adapted to extend through suitably formed apertures 35 formed in the hubs 36 of the ring 16 and gear 18.

Formed in the opposite ends of the shaft 12 of the illustrative embodiment are longitudinally extending centrally disposed bores or openings 37 adapted to receive therein clutch operating or bell-crank lever actuating members or wedges 38, the said wedges being slidably mounted in the bores 37 and secured against rotation therein by means of bolts or cap screws 39 screw-threaded into the shell portions formed by bores 37 adjacent the ends of the shaft 12, and having heads 40 extending into the bores 37 in a manner to be slidably received in longitudinally extending grooves or key-ways 41 formed in the faces of the lever actuating wedges 38.

Figure 3:
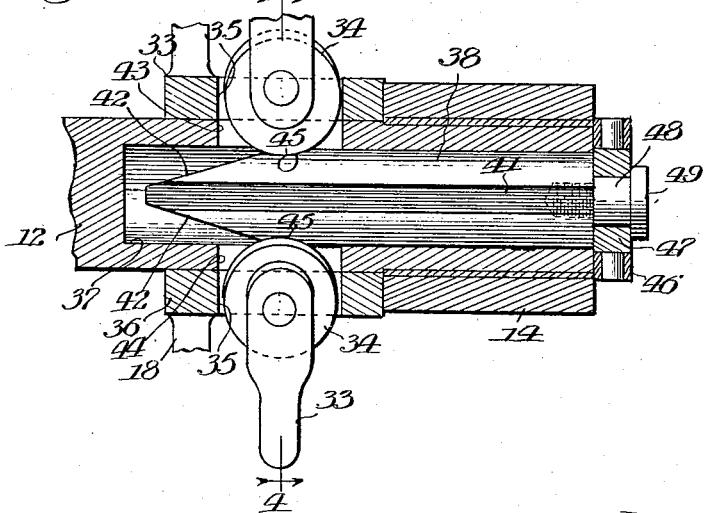
Fig. 3 is a fragmentary sectional plan view taken on the line 3—3 of Fig. 2.

The wedges 38 are adapted to extend inwardly from the ends of the shaft 12, beyond and between the rollers 34 of the respective bell-crank levers, and are provided on their inner ends with inclined tapered faces 42 adapted to engage the rollers 34, extending through apertures 43 formed in opposite sides of the shaft 12 in register with the apertures 35 of the hub 36, in a manner to force the rollers 34 of the respective bell-crank levers apart when the wedges 38 are moved inwardly of the shaft 12 to the position shown in Fig. 3 of the drawings, and to permit the rollers to approach each other under the action of tension springs 44 when the wedges are moved outwardly to the position shown at the left hand end of Fig. 1.

Formed on opposite sides of the wedges 38 in the plane of and adjacent the rollers 34 are arcuate shaped notches or depressions 45 adapted to receive the arcuate faces of the rollers 34 when the wedges 38 are moved to their innermost position, thereby resisting the tendency of the springs 44 to force the wedges 38 outwardly of the bores 37, as would be the case if the rollers 34 were permitted to bear upon the inclined tapered faces 42 of the wedges when in their innermost position, thus providing, in effect, self-contained means for releasibly securing the wedges in adjusted clutch actuating position.

For shifting the wedges 38 longitudinally of the bores 37, any suitable form of clutch shipper mechanism may be employed, as, for example, a forked lever 46 may be connected to a clutch collar 47 rotatably mounted on a shoulder bolt 48 screw-threaded into one of the ends of the respective wedges, and having a head 49 formed thereon between which and the end of the wedge 38, the collar 47 is designed to operate.

If desired, the clutch drums 24 and 25 may be made to accommodate contracting brake bands 50 and 51 operatively connected with suitable actuating means mounted on the stationary body or frame of a machine for controlling the movement of the said drums when the driving power is disconnected therefrom.

It will be observed from the foregoing description that if it is desired to rotate or drive the cable drum 11 by connecting the clutch drum 25 to the gear 18, the wedge 38 at the right hand end of Fig. 1, may be moved inwardly of the shaft 12 along the bore 37 by the clutch collar 47 to the position shown in Figs. 1 and 3, thereby forcing the inclined tapered faces 42 between adjacent faces of the anti-friction rollers 34, thus moving the rollers outwardly or away from each other and rocking the bell-crank levers 29 about their pivotal connections 30 on the gear 18 and causing the clutch bands 23 to be contracted or drawn tightly around the clutch drum 25 in a manner to cause the said clutch drum and cable drum 11 to rotate with the gear 18 and shaft 12. When the wedge 38 has been moved inwardly sufficiently far to permit the rollers 34 to occupy a position in the depressions 45, the actuating force exerted by the clutch collar 47 may be released and the bands 23 will remain in drum-engaging position until it is desired to release the drum by moving the wedge 38 outwardly of the bore 37 and permitting the rollers 34 to approach each other under the action of the springs 44, thereby rocking the bell-crank levers 29 about their pivotal connections 30 in the opposite direction and disengaging the bands 23 from driving contact with the clutch drum 25.

It will be observed also that the cable drum 10 may be driven and released in a similar manner by actuating the wedge 38 at the left hand end of Fig. 1, and that with the arrangement shown in the illustrative embodiment, either or both of the cable drums 10, 11 may be driven at the will of the operator by actuating one or the other, or both, of the forked levers 46.

It will be further observed that the present invention provides an efficient, durable and sturdy clutch operating device of simple and compact construction consisting of a minimum number of parts, and which may be conveniently associated, in a novel way, with the drive shaft of a structure with which it is intended to be used.

Obviously, the present invention is not limited to the precise construction and arrangement shown and described, as the same may be variously modified. Moreover, all the features of the invention need not be used conjointly, as the same may be used in variously different combinations and sub-combinations.

What we claim as our invention and desire to secure by Letters Patent is:

1. In a clutch operating device, the combination of a shaft having a longitudinally extending bore and radially disposed apertures formed therein, a driving member secured to said shaft, a driven member rotatably mounted on said shaft, means for operatively connecting said members, said means including a tapered member having a plurality of depressions formed therein, a clutch drum carried by said driven member, clutch bands and levers carried by said driving member, means for connecting said bands and levers, anti-friction means mounted on said levers and adapted to extend through said apertures in a manner to co-operate with said tapered member, and means for moving said tapered member between said anti-friction means and positioning said depressions in engagement with said anti-friction means in a manner to cause said bands to be drawn into contact with said drum.

2. In a clutch operating device, the combination of a shaft having a centrally disposed longitudinally extending bore and radially disposed apertures formed therein, a driving member secured to said shaft and including a hub portion having radially disposed apertures therein adapted to conform to and register with the apertures formed in said shaft, a driven member rotatably mounted on said shaft, means for operatively connecting said members, said means including a tapered member having a plurality of transversely extending radially disposed peripheral depressions and a longitudinally extending groove formed therein, means carried by said shaft and co-operable with said groove for securing said tapered member against rotation in said bore, a clutch drum carried by said driven member, clutch bands and levers carried by said driving member, adjustable means for connecting said bands and levers, anti-friction rollers mounted on said levers and adapted to extend through said apertures at opposite sides of said tapered member, means for moving said tapered member longitudinally of said bore in a manner to engage and move said rollers outwardly and to position said depressions adjacent the rollers, thereby moving said levers outwardly to cause said bands to be drawn into contact with said drum, and means for moving said levers in opposite direction to remove said bands from contact with said drum when said tapered member is withdrawn from engagement with said rollers.

3. In a clutch operating device, the combination of a shaft having a longitudinally extending bore and a radially disposed aperture formed therein and communicating with the said bore, a driving member secured to said shaft, a driven member rotatably mounted on said shaft, means for operatively connecting said members, said means including a wedge-shaped member having a depression formed in one of the surfaces thereof, a clutch drum carried by said driven member, a clutch band and lever carried by said driving member, means for connecting said clutch band and lever, anti-friction means mounted on said lever and adapted to extend through said aperture in a manner to engage said wedge-shaped member, and means for moving said wedge-shaped member longitudinally within the bore of said shaft for bringing said depression therein into engagement with said anti-friction means in a manner to cause said band to be drawn into contact with said drum.

Signed at Chicago, Illinois, this 28th day of February, 1928.

ROY S. MOORE.

Signed at Manitowac, Wisconsin, this 29th day of February, 1928.

EDWARD B. NICKLES.